(12) United States Patent
Athley et al.

(10) Patent No.: US 10,285,179 B2
(45) Date of Patent: May 7, 2019

(54) FLEXIBLE RECONFIGURATION OF AN ANTENNA ARRANGEMENT

(71) Applicant: TELEFONAKTIEBOLAGET LM ERICSSON (PUBL), Stockholm (SE)

(72) Inventors: Fredrik Athley, Kullavik (SE); Martin Johansson, Mölndal (SE); Andreas Nilsson, Göteborg (SE); Sven Petersson, Sävedalen (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 180 days.

(21) Appl. No.: 15/108,535

(22) PCT Filed: Jun. 13, 2016

(86) PCT No.: PCT/EP2016/063483
§ 371 (c)(1),
(2) Date: Jun. 27, 2016

(87) PCT Pub. No.: WO2017/215730
PCT Pub. Date: Dec. 21, 2017

(65) Prior Publication Data
US 2018/0124761 A1 May 3, 2018

(51) Int. Cl.
*H01Q 3/24* (2006.01)
*H04W 72/04* (2009.01)
(Continued)

(52) U.S. Cl.
CPC ........ *H04W 72/046* (2013.01); *H04B 7/0615* (2013.01); *H04B 7/0617* (2013.01);
(Continued)

(58) Field of Classification Search
CPC .. H04B 7/0617; H04B 7/0413; H04B 7/0408; H04B 7/0469; H04B 7/0452; H04B 7/0695; H04B 7/0456; H04B 7/10; H04B 7/0634; H04B 7/0639; H04B 7/086; H04B 7/088; H04B 7/2628; H04B 7/0626; H04W 16/02
See application file for complete search history.

(56) References Cited

U.S. PATENT DOCUMENTS

2004/0242272 A1* 12/2004 Aiken ............... H01Q 1/246
455/562.1

* cited by examiner

*Primary Examiner* — Gary Lafontant
(74) *Attorney, Agent, or Firm* — Rothwell, Figg, Ernst & Manbeck, P.C.

(57) ABSTRACT

There is provided mechanisms for selectively serving either one sector in an N sector system or two sectors in a 2·N sector system, where N≥1, using an antenna array comprising at least 4 antenna columns, where each antenna column comprising physical antenna elements. A method comprises generating at least one virtual antenna port pair per sector using the physical antenna elements. Each virtual antenna port in the at least one virtual antenna port pair is obtained by combining physical antenna elements having orthogonal polarization such that two virtual antenna ports in each virtual antenna port pair have identical power radiation patterns and orthogonal polarizations, and at least one antenna element per polarization has a non-zero weight. The method comprises transmitting signals using the at least one virtual antenna port pair per sector in one sector in the N sector system or in two sectors in the 2·N sector system.

18 Claims, 8 Drawing Sheets

(51) Int. Cl.
*H04B 7/06* (2006.01)
*H04W 16/28* (2009.01)
*H01Q 21/00* (2006.01)
(52) U.S. Cl.
CPC ........ *H04W 16/28* (2013.01); *H01Q 21/0025* (2013.01); *H04B 7/0697* (2013.01)

FLEXIBLE RECONFIGURATION OF AN ANTENNA ARRANGEMENT

CROSS REFERENCE TO RELATED APPLICATION(S)

This application is a 35 U.S.C. § 371 National Phase Entry Application from PCT/EP2016/063483, filed Jun. 13, 2016, designating the United States, the disclosure of which is incorporated herein in its entirety by reference.

TECHNICAL FIELD

Embodiments presented herein relate to a method, an antenna array, a computer program, and a computer program product for selectively serving either one sector in an N sector system or two sectors in a 2·N sector system.

BACKGROUND

In wireless communications networks, antenna design may be key to obtaining good performance and capacity. This applies for the wireless communication from a network node to a wireless user terminal or conversely, as well as between two network nodes.

Multi-antenna techniques are used in cellular wireless communications to improve coverage, capacity, and reliability. Typical base antennas comprise one or more antenna columns along a horizontal direction, where each column typically consists of multiple dual-polarized radiating elements arranged along a vertical direction. These radiating elements are typically combined via a passive feed network to create a narrow elevation beam. Furthermore, a linear phase progression or time delay may be applied over the vertically displaced radiating elements to tilt the elevation beam below the horizon in order to reduce the interference transmitted to adjacent sites. A radio and baseband branch is then typically connected to each polarization on each column, enabling signal processing in the azimuth and polarization domains.

In cellular wireless communications, sectorization can be used to increase the system capacity. Typical deployments use three sectors per site, but in areas where extra high capacity is needed six sectors per site are also used. Sectorization can be achieved by having directive antennas pointing in different directions so that the different sectors become spatially isolated. This can be achieved by mechanically steering directive antennas in the desired directions, by analog or digital beamforming (BF), or by a combination thereof.

The spatial degrees of freedom (DoF) offered by a multi-antenna solution can also be used for user-specific beam-forming (UE-specific BF), diversity, and spatial multiplexing to further increase the performance of a system. For a given amount of antenna, radio, and baseband resources there exist trade-offs regarding what the available DoF should be used for. For example, an antenna arrangement could be used for sectorization, UE-specific BF, diversity, and/or spatial multiplexing. Devoting DoF to one of these functions may sacrifice the available DoF for other functions. How the available DoF should be allocated to different functions depends on many aspects and may vary over time and between different sites over a cellular network.

Hence, there is still a need for a flexible antenna arrangement.

SUMMARY

An object of embodiments herein is to provide a flexible antenna arrangement.

According to a first aspect there is presented a method for selectively serving either one sector in an N sector system or two sectors in a 2·N sector system, where N≥1, and using an antenna array comprising at least 4 antenna columns, each antenna column comprising physical antenna elements. The method comprises generating at least one virtual antenna port pair per sector using the physical antenna elements. Each virtual antenna port in the at least one virtual antenna port pair is obtained by combining physical antenna elements having orthogonal polarization such that two virtual antenna ports in each virtual antenna port pair have identical power radiation patterns and orthogonal polarizations, and at least one antenna element per polarization has a non-zero weight. The method comprises transmitting signals using the at least one virtual antenna port pair per sector in one sector in the N sector system or in two sectors in the 2·N sector system.

Advantageously this enables efficient reconfiguration of the antenna arrangement, thereby enabling the antenna arrangement to be flexible.

Advantageously this enables a single antenna product to be easily adapted to many different requirements.

According to a second aspect there is presented an antenna arrangement for selectively serving either one sector in an N sector system or two sectors in a 2·N sector system, where N≥1. The antenna arrangement comprises an antenna array. The antenna array comprises at least 4 antenna columns. Each antenna column comprises physical antenna elements. The antenna arrangement further comprises a processing unit. The processing unit is configured to cause the antenna arrangement to generate at least one virtual antenna port pair per sector using the physical antenna elements. Each virtual antenna port in the at least one virtual antenna port pair is obtained by combining physical antenna elements having orthogonal polarization such that two virtual antenna ports in each virtual antenna port pair have identical power radiation patterns and orthogonal polarizations, and at least one antenna element per polarization has a non-zero weight. The processing unit is configured to cause the antenna arrangement to transmit signals using the at least one virtual antenna port pair per sector in one sector in the N sector system or in two sectors in the 2·N sector system.

According to a third aspect there is presented an antenna arrangement for selectively serving either one sector in an N sector system or two sectors in a 2·N sector system, where N≥1. The antenna arrangement comprises an antenna array. The antenna array comprises at least 4 antenna columns. Each antenna column comprises physical antenna elements. The antenna arrangement further comprises a processing unit and a computer program product. The computer program product stores instructions that, when executed by the processing unit, cause the antenna arrangement to perform steps, or operations. The steps, or operations, cause the antenna arrangement to generate at least one virtual antenna port pair per sector using the physical antenna elements. Each virtual antenna port in the at least one virtual antenna port pair is obtained by combining physical antenna elements having orthogonal polarization such that two virtual antenna ports in each virtual antenna port pair have identical power radiation patterns and orthogonal polarizations, and at least one antenna element per polarization has a non-zero weight. The steps, or operations, cause the antenna arrangement to transmit signals using the at least one virtual antenna port pair per sector in one sector in the N sector system or in two sectors in the 2·N sector system.

According to a fourth aspect there is presented an antenna arrangement for selectively serving either one sector in an N sector system or two sectors in a 2·N sector system, where The antenna arrangement comprises an antenna array. The antenna array comprises at least 4 antenna columns. Each antenna column comprises physical antenna elements. The antenna arrangement further comprises a generate module configured to generate at least one virtual antenna port pair per sector using the physical antenna elements. Each virtual antenna port in the at least one virtual antenna port pair is obtained by combining physical antenna elements having orthogonal polarization such that two virtual antenna ports in each virtual antenna port pair have identical power radiation patterns and orthogonal polarizations, and at least one antenna element per polarization has a non-zero weight. The antenna arrangement further comprises a transmit module configured to transmit signals using the at least one virtual antenna port pair per sector in one sector in the N sector system or in two sectors in the 2·N sector system.

According to a fifth aspect there is presented a network node comprising an antenna arrangement according to any of the second, third, or fourth aspect.

According to a sixth aspect there is presented a wireless device comprising an antenna arrangement according to any of the second, third, or fourth aspect.

According to a seventh aspect there is presented a computer program for selectively serving either one sector in an N sector system or two sectors in a 2·N sector system, the computer program comprising computer program code which, when run on an antenna arrangement, causes the antenna arrangement to perform a method according to the first aspect.

According to an eight aspect there is presented a computer program product comprising a computer program according to the seventh aspect and a computer readable storage medium on which the computer program is stored.

It is to be noted that any feature of the first, second, third, fourth, fifth, sixth, seventh and eight aspects may be applied to any other aspect, wherever appropriate. Likewise, any advantage of the first aspect may equally apply to the second, third, fourth, fifth, sixth, seventh and/or eight aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Hereinafter will be disclosed an active array antenna architecture using dual-polarization beamforming (DPBF) and being reconfigurable to serve one sector in an N sector system or two sectors in a 2·N sector system. The herein disclosed embodiments enable a single antenna product to be easily adapted to many different requirements. Power consuming resources can be dynamically turned on and off to follow instantaneous variations in traffic demand in order to save power consumption.

Figure 1:
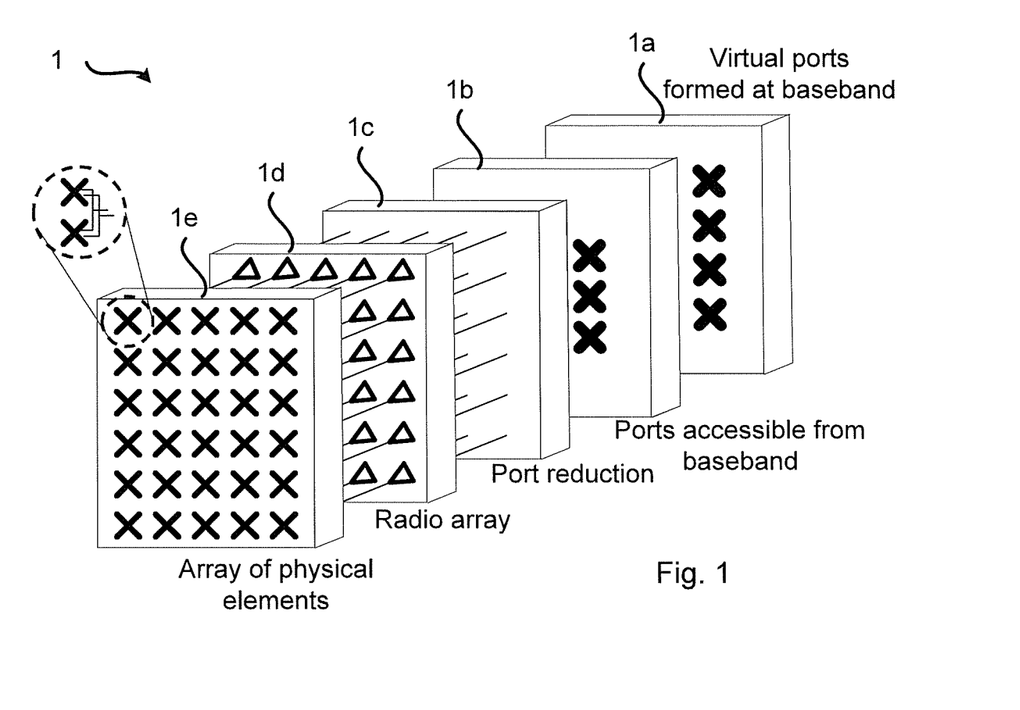
FIGS. 1, 2, 3, 4, and 5 are schematic diagrams illustrating different aspects of antenna arrays according to embodiments.

FIG. 1 is a schematic block diagram illustrating an example architecture of a two dimensional antenna array 1 for which embodiments presented herein can be applied. However, the embodiments presented herein are equally applicable to one-dimensional antenna arrays. The antenna array 1 can thus either be a linear array (1-D), a uniform linear array (ULA), or planar array (2-D), uniform rectangular array (URA).

The antenna front end comprises an array 1e of antenna elements where each antenna element can be a sub-array of several radiating antenna elements connected via feed networks to two sub array ports having orthogonal polarization. Hence, the antenna array 1 comprises dual polarized elements. In this respect the term dual polarized elements shall be interpreted to encompass two sets of single polarized elements having mutually orthogonal polarization.

Each subarray port is connected to a radio chain as comprised in a radio array 1d. The number of subarray ports in block 1b accessible to baseband signal processing can be reduced via a port reduction block 1c that creates new antenna ports that are (linear) combinations of the input antenna ports. Access for a signal to be transmitted is made to the subarray ports at a baseband frequency representation of the signal if both dedicated and broadcasted data are to be transmitted at the same time. Further, in general terms, access to all subarray ports can be needed for shaping wide beams according to the herein disclosed mechanisms for beam forming. In the baseband signal processing block 1a virtual antenna ports can be created by matrix multiplications. These virtual antenna ports can be of different type.

For example, in LTE they can for a radio base station carry common reference signals (CRS) at ports 0-3, channel state information reference signals (CSI-RS) at port 15-22, and UE-specific reference signals and data at ports 7-14. In some implementations one or several blocks of the in the two dimensional antenna array 1 in FIG. 1 can be removed.

Figure 2:
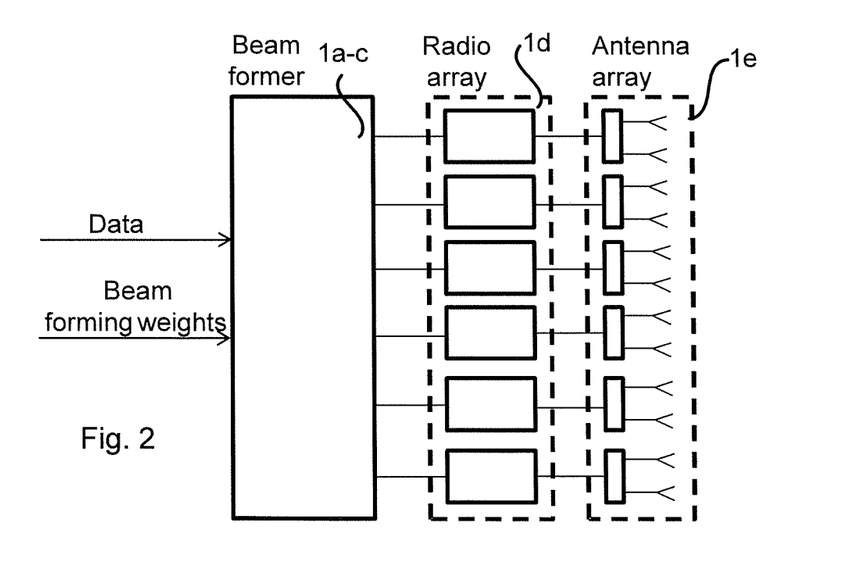
Figure 3:
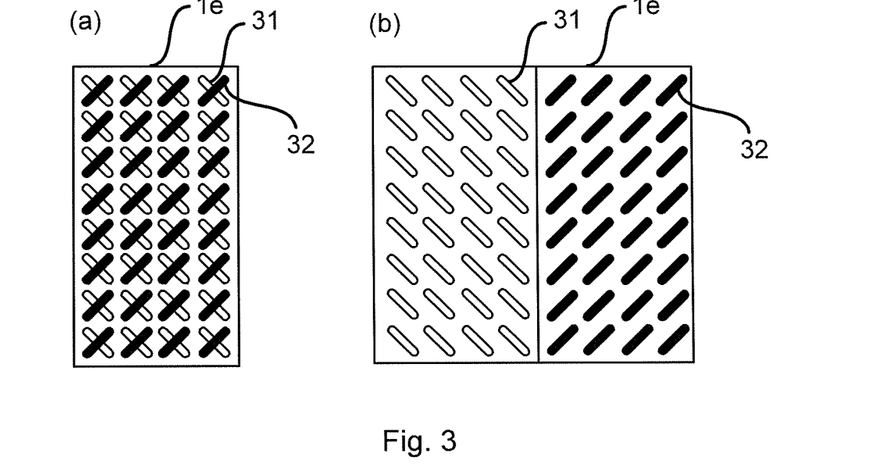

FIG. 2 is a schematic block diagram illustrating a possible implementation of the two dimensional antenna array 1 of FIG. 1. It comprises a beam former comprising blocks 1a, 1b, 1c of FIG. 1, a radio array id and a physical antenna array 1e. In the example of FIG. 2 there are two antenna ports per subarray. The beam former 1a-c is configured to receive user data and control data, beam forming weights for the user data, beam forming weights for reference signals, such as CSI-RS and beam forming weights for wide beam transmission. Each antenna element comprises two sub-elements 31, 32 having orthogonal polarizations in all directions (of interest). Typically these two sub-elements 31, 32 are located at the same position, as in FIG. 3(a), but they can as well be displaced in relation to each other, as in FIG. 3(b).

Figure 4:
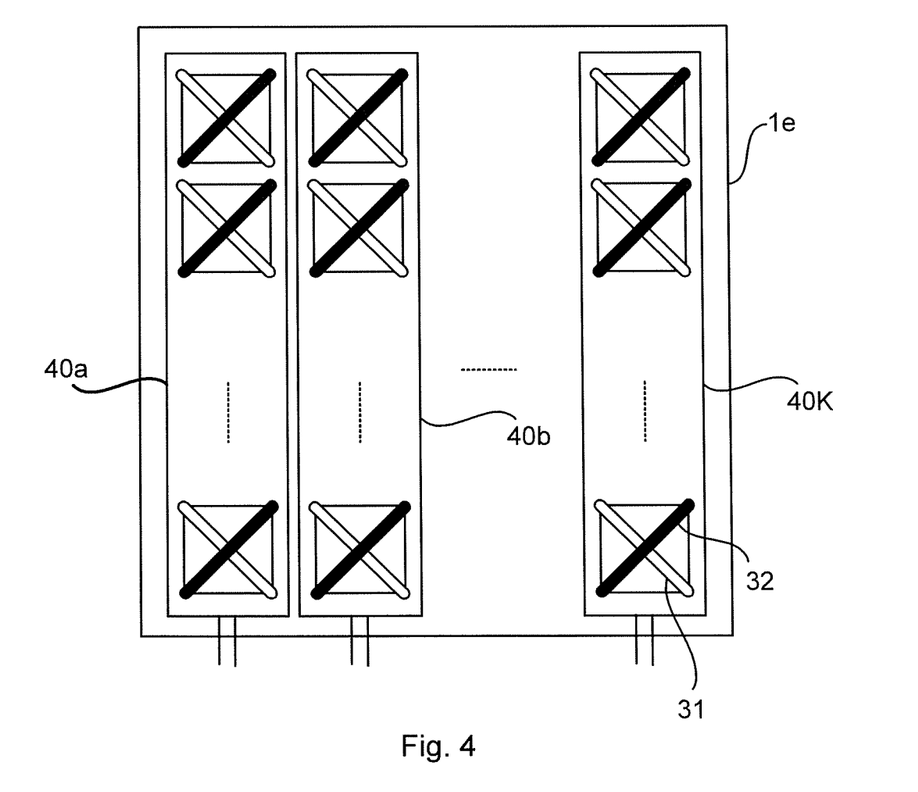

As will be described below, the antenna array 1 can be part of an antenna arrangement 100. The antenna arrangement 100 is configured for beam forming in either an N sector system or a 2·N sector system, where N≥1. Needless to say, N is an integer. The antenna arrangement 200 comprises an antenna array 1, where the antenna array 1 comprises at least 4 antenna columns. FIG. 4 schematically illustrates an array 1e of antenna elements 31, 32, where the array 1e comprises antenna columns 40a, 40b, 40K.

The antenna arrangement 100 is configured to generate at least one virtual antenna port pair per sector using the physical antenna elements 31, 32. Each virtual antenna port in the at least one virtual antenna port pair is obtained by combining physical antenna elements 31, 32 having orthogonal polarization such that two virtual antenna ports in each virtual antenna port pair have identical power radiation patterns and orthogonal polarizations, and wherein at least one antenna element 31, 32 per polarization has a non-zero weight. This property will hereinafter be denoted as dual-polarization beamforming (DPBF).

The antenna arrangement 100 is configured to transmit signals using the at least one virtual antenna port pair per sector in one sector in the N sector system or in two sectors in the 2·N sector system.

The antenna array based on DPBF that can thereby be adaptively reconfigured to serve one sector in an N sector system or two sectors in a 2·N sector system. According to an embodiment, N=3. The reconfiguration between N and 2·N sector operation can be performed by digital signal processing. Appropriate sector beam patterns for the different operation modes are achieved by DPBF, enabling energy efficient generation of desired beam pattern shapes.

The non-zero weights can be designed to give good power utilization when transmitting uncorrelated signals over multiple sectors and/or virtual antenna ports. Hence, according to an embodiment the non-zero weight is determined for transmission of the signals in multiple of the sectors and/or using multiple virtual antenna ports.

Further, according to an embodiment, non-zero weights of the antenna columns are determined such that $$a_k^2 + a_{K-k}^2 = c$$

where $a_k$ denotes the weight for antenna column k (in an antenna array having K antenna columns) and c≠0 is a constant.

Figure 5:
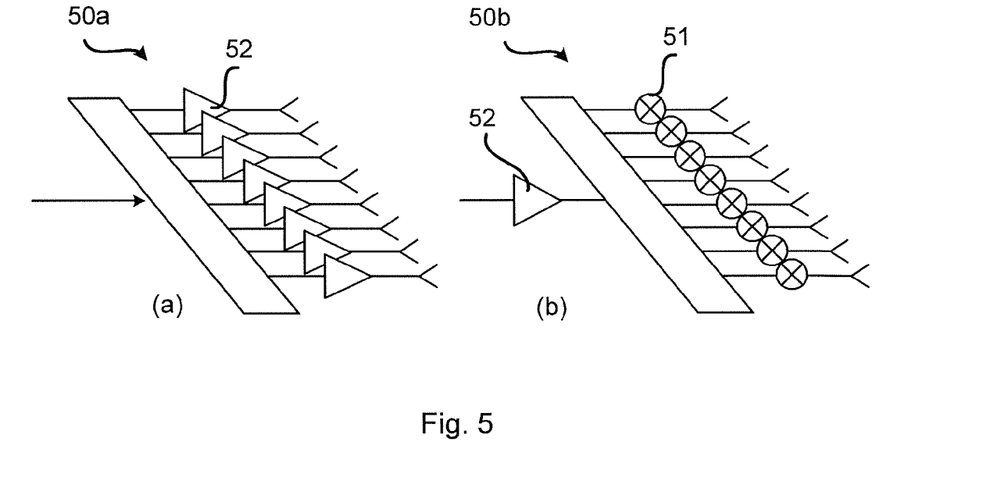

One reason for designing antenna ports such that all antenna elements in the array are subject to the same average power is to enable efficient use of the available power resource(s). This applies specifically for an active antenna array with distributed power amplifiers but it also applies for an antenna array with a power distribution network 50 comprising phase shifters 51, possibly also attenuators 52 as in FIG. 5(a) and 5(b). This is especially suitable for beamforming performed via phase shifters only.

However, the antenna array can also operate in low-power mode by, for example, turning off PAs, radios, and baseband resources that are not needed to meet the instantaneous capacity need, e.g. during night-time when the traffic demand usually is low. Hence, according to an embodiment one or more of the antenna columns 40a, 40b, 40K are turned off when transmitting the signals. For example, all but one of the antenna columns 40a, 40b, 40K could be turned off when transmitting the signals. According to some aspects the one or more of the antenna columns 40a, 40b, 40K are selectively turned on and off depending on a network traffic demand in the one sector or the two sectors.

FIGS. 6(a)-(f) illustrate embodiments on how the active antenna can be configured. In the illustrative examples of FIGS. 6(a)-(f) a site is assumed to be configured with 3 such antenna configurations, so that the number of sectors per site become 3, 4, 5, or 6 depending on the configuration of each antenna. In more detail, FIGS. 6(a)-(f) illustrate arrays 1e of antenna elements and the corresponding produced cell-specific BF pattern 70a and UE-specific BF pattern 70b (where applicable).

Figure 6:
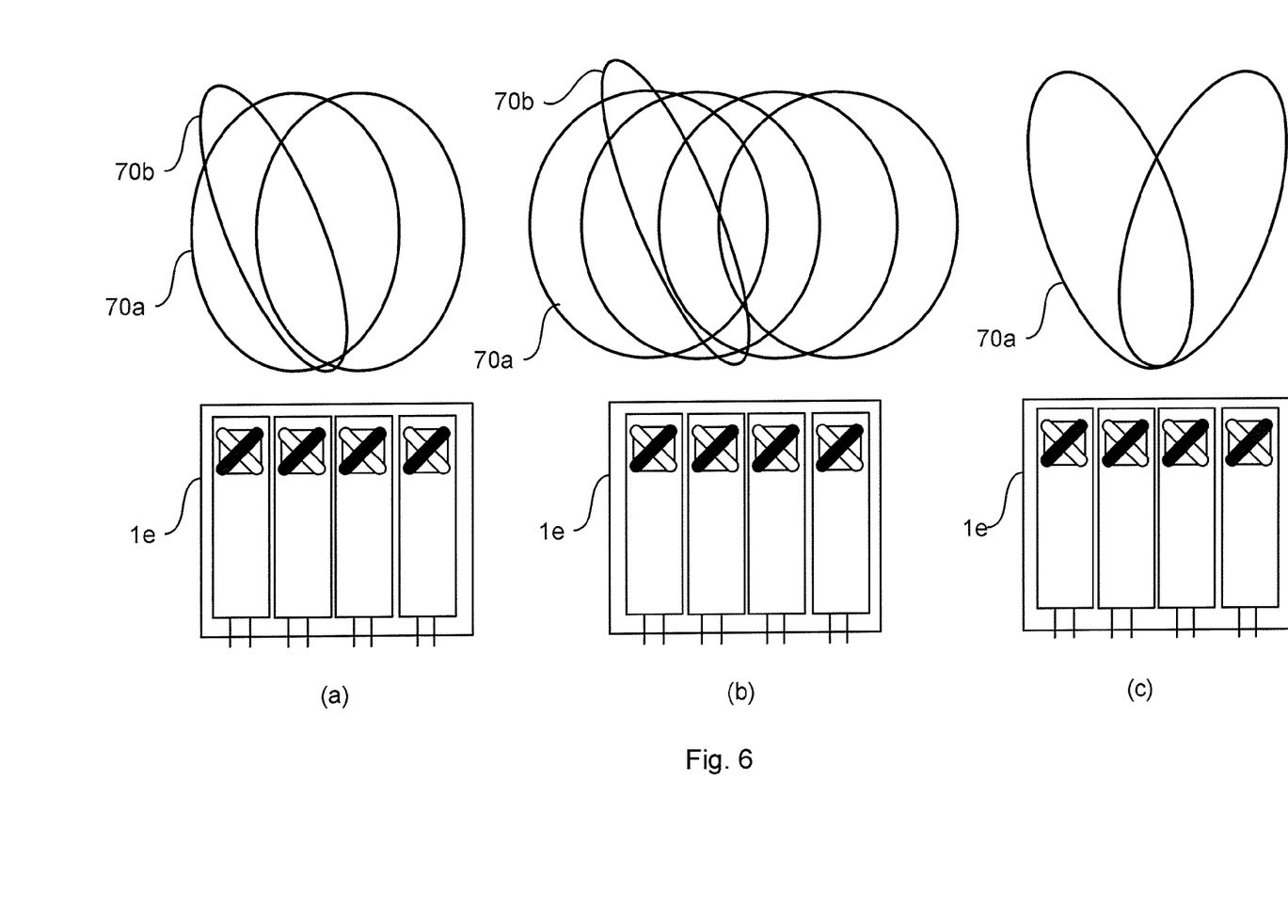
FIG. 6 illustrates antenna configurations according to embodiments.

FIG. 6(a) illustrates an embodiment of 3 sectors with 4 ports per sector. The sector pattern is optimized by DPBF over the physical antennas. There are two pairs of ports with different phase centers and orthogonal polarizations within each pair. The displaced phase centers enable UE-specific BF 70b with 2 ports per polarization. Hence, according to an embodiment two pairs of orthogonal virtual antenna ports are generated for one sector.

FIG. 6(b) illustrates an embodiment of 3 sectors with 8 ports per sector. In this configuration, there are not enough DoF to perform any shaping of the sector pattern. The sector pattern will in this case be same as the pattern of a physical antenna element, which is typically wider than the sector pattern in configuration A. In this configuration, 4 ports per polarization can be used for UE-specific BF 70b. Hence, according to an embodiment four pairs of orthogonal virtual antenna ports are generated for one sector.

FIG. 6(c) illustrates an embodiment of 6 sectors with 2 ports per sector. The sector pattern is optimized by DPBF over all four antenna columns. The sector pattern in this case is narrower than the sector pattern in the configuration used in FIG. 6(a). UE-specific BF cannot be performed with this configuration, but transmission diversity or precoding over two orthogonal polarizations is possible. An alternative 6-sector configuration is to use only two or three columns in the sector pattern generation. Then, 4 ports per sector will be available which enables UE-specific BF. Hence, according to an embodiment one pair of orthogonal virtual antenna ports is generated for two sectors.

FIG. 6(d) illustrates an embodiment of 3 sectors, 2 ports per sector, and where 4 antenna branches (PAs and radios in 2 antenna columns) are turned off to save power consumption. This configuration can be used during time periods, or by sites, with low traffic demand, where sufficient performance may be achieved with 2 antenna columns. If the traffic demand increases, the antenna can be reconfigured to one of the configurations that use all branches. The sector pattern is optimized by DPBF over 2 antenna columns. Hence, according to an embodiment one pair of orthogonal virtual antenna ports is generated for one sector, and half of all antenna columns are turned off when transmitting the signals.

FIG. 6(e) illustrates an embodiment of 3 sectors, 4 ports per sector, and where 4 antenna branches are turned off. In this configuration, UE-specific BF 70b with 2 ports per polarization is possible but not shaping of the sector pattern. Hence, according to an embodiment two pairs of orthogonal virtual antenna ports are generated for one sector, and half of all antenna columns are turned off when transmitting the signals.

FIG. 6(f) illustrates an embodiment of 3 sectors, 2 ports per sector, and where 6 antenna branches are turned off. In this configuration, only one antenna column is active, which saves even more power than if fewer, or none, antenna branches are turned off. Sector pattern shaping or UE-specific BF is not possible in this configuration; only polarization diversity or precoding. Hence, according to an embodiment one pair of orthogonal virtual antenna ports is generated for one sector, and more than half of all antenna columns are turned off when transmitting the signals.

As the skilled person understands the embodiments of FIGS. 6(a)-(f) represent six example configurations and other configurations are also possible within the scope of the herein disclosed method and antenna arrangements.

Figure 7:
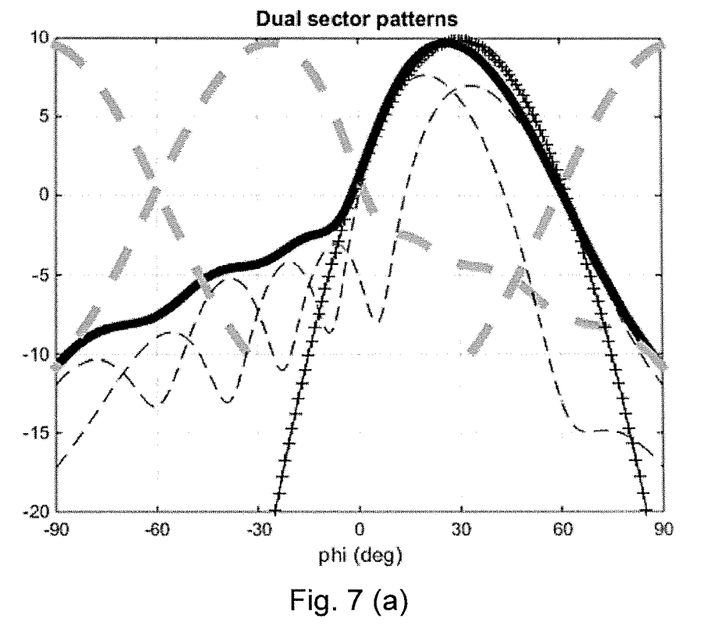
FIG. 7 shows simulation results according to embodiments.

FIGS. 7(a)-(c) show three examples of synthesized patterns resulting from configurations as herein disclosed. These three examples have been obtained by DPBF for dual (as in FIGS. 7(a) and 7(b)) and single (as in FIG. 7(c) sector patterns). In these examples, the half-power beamwidth (HPBW) of a physical antenna element is 90° and the separation between antenna columns is 0.5λ. The solid pattern is the synthesized pattern, the bold dashed patterns are the corresponding patterns in neighboring sectors, the thin dashed patterns are the patterns of the individual polarizations, and the '+' patterns are Gauss beams with 65° HPBW (typical HPBW of a conventional dual- or single-sector antenna). The patterns in FIG. 7(a) and 7(c) are obtained with full (100%) PA utilization while the pattern in FIG. 7(b) is obtained with some amplitude taper to allow for more DoF in the pattern synthesis. The pattern in FIG. 7(b) is obtained with 82% PA utilization.

The results in FIGS. 7(a)-(c) show that it is possible to design sector pattern shapes using the herein disclosed method and antenna arrangements 100.

Figure 9:
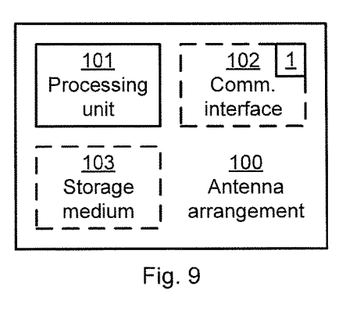
FIG. 9 is a block diagram showing functional units of an antenna arrangement according to an embodiment.

FIG. 9 schematically illustrates, in terms of a number of functional units, the components of an antenna arrangement 100 according to an embodiment. A processing unit 101 is provided using any combination of one or more of a suitable central processor (CPU), multiprocessor, microcontroller, digital signal processor (DSP), application specific integrated circuit (ASIC), field programmable gate arrays (FPGA) etc., capable of executing software instructions stored in a computer program product 130 (as in FIG. 13), e.g. in the form of a storage medium 103. Thus the processing unit 101 is thereby arranged to execute methods as herein disclosed. For example, the processing unit 101 is configured to generate at least one virtual antenna port pair and to transmit signals using the at least one virtual antenna port pair as herein disclosed.

The storage medium 103 can also comprise persistent storage, which, for example, can be any single one or combination of magnetic memory, optical memory, solid state memory or even remotely mounted memory. The antenna arrangement 100 can further comprise a communications interface 22 for transmitting and receiving signals As such the communications interface 22 can comprise an antenna array as in any of FIGS. 1, 2, 3, 4 and 5.

The processing unit 101 controls the general operation of the antenna arrangement 100 e.g. by sending data and control signals to the communications interface 102 and the storage medium 103, by receiving data and reports from the communications interface 102, and by retrieving data and instructions from the storage medium 103. Other components, as well as the related functionality, of the antenna arrangement 100 are omitted in order not to obscure the concepts presented herein.

Figure 10:
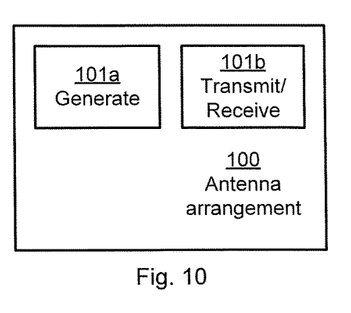
FIG. 10 is a block diagram showing functional modules of an antenna arrangement according to an embodiment.

FIG. 10 schematically illustrates, in terms of a number of functional modules, the components of an antenna arrangement 100 according to an embodiment. The antenna arrangement 100 of FIG. 10 comprises a generate module 101a configured to perform below step S102, and a transmit module both configured to perform below step S104. The antenna arrangement 100 of FIG. 10 can further comprise a number of optional functional modules. The functionality of each functional module 101a-101b is evident from the context of which the functional modules 101a-101b can be used. In general terms, each functional module 101a-101b can be implemented in hardware or in software. Preferably, one or more or all functional modules 101a-101b can be implemented by the processor 10, possibly in cooperation with functional units 102 and/or 103. The processor 101 can thus be arranged to from the storage medium 103 fetch instructions as provided by a functional module 101a-101b and to execute these instructions, thereby performing any steps as will be disclosed hereinafter.

Figure 11:
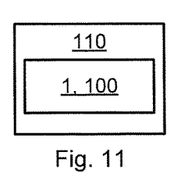
FIG. 11 schematically illustrates a network node comprising an antenna arrangement according to embodiments.
Figure 12:
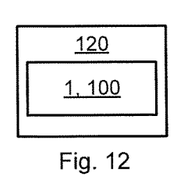
FIG. 12 schematically illustrates a wireless device comprising an antenna arrangement according to embodiments.

The antenna array 1 and/or the antenna arrangement 100 can be provided as integrated circuits, as standalone devices or as a part of a further device. For example, the antenna array 1 and/or antenna arrangement 100 can be provided in a radio transceiver device, such as in a network node no or a wireless device 120. FIG. 11 illustrates a network node no comprising at least one antenna array 1 and/or antenna arrangement 100 as herein disclosed. The network node no can be a base transceiver station (BTS), a NodeB, an evolved NodeB, an access node a repeater, a backhaul node, or the like. FIG. 12 illustrates a wireless device 120 comprising at least one antenna array 1 and/or antenna arrangement 100 as herein disclosed. The wireless device 120 can be a user equipment (UE), a mobile phone, a tablet computer, a laptop computer, a wireless modem, etc. or the like.

The antenna array 1 and/or antenna arrangement 100 can be provided as an integral part of the further device. That is, the components of the antenna array 1 and/or antenna arrangement 100 can be integrated with other components of the further device; some components of the further device and the antenna array 1 and/or antenna arrangement 100 can be shared. For example, if the further device as such comprises a processor, this processor can be configured to perform the actions of the processor 101 associated with the antenna arrangement 100. Alternatively the antenna array 1 and/or antenna arrangement 100 can be provided as separate units in the further device.

Figure 13:
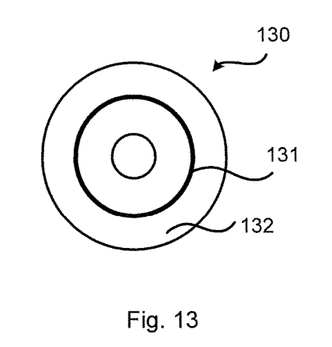
FIG. 13 schematically illustrates a computer program product according to an embodiment.

FIG. 13 shows one example of a computer program product 130 comprising computer readable means 132. On this computer readable means 132, a computer program 131 can be stored, which computer program 131 can cause the processing unit 101 and thereto operatively coupled entities and devices, such as the communications interface 102 and the storage medium 103, to execute methods according to embodiments described herein. The computer program 131 and/or computer program product 130 can thus provide means for performing any steps as herein disclosed.

In the example of FIG. 13, the computer program product 130 is illustrated as an optical disc, such as a CD (compact disc) or a DVD (digital versatile disc) or a Blu-Ray disc. The computer program product 130 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 131 is here schematically shown as a track on the depicted optical disk, the computer program 131 can be stored in any way which is suitable for the computer program product 130.

Figure 8:
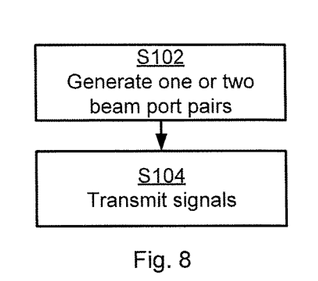
FIG. 8 is a flowchart of a method according to an embodiment.

Reference is now made to FIG. 8 illustrating a method for selectively serving either one sector in an N sector system or two sectors in a 2·N sector system according to an embodiment. The method is performed by an antenna arrangement 100 comprising the antenna array 1 as disclosed above. The method is advantageously provided as a computer program 131.

The method comprises, in a step S102, generating at least one virtual antenna port pair per sector using the physical antenna elements. Each virtual antenna port in the at least one virtual antenna port pair is determined according to DPBF. Hence, each virtual antenna port in the at least one virtual antenna port pair is obtained by combining physical antenna elements 31, 32 having orthogonal polarization such that two virtual antenna ports in each virtual antenna port pair have identical power radiation patterns and orthogonal polarizations, and wherein at least one antenna element 31, 32 per polarization has a non-zero weight.

The method comprises, in a step S104, transmitting signals using the at least one virtual antenna port pair per sector in one sector in the N sector system or in two sectors in the 2·N sector system.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for selectively serving either one sector in an N sector system or two sectors in a 2·N sector system, where N≥1, and using an antenna array comprising at least 4 antenna columns, each antenna column comprising physical antenna elements, the method comprising:
generating at least one virtual antenna port pair comprising a first virtual antenna port and a second virtual antenna port per sector using the physical antenna elements,
wherein each of the first and the second virtual antenna port in said at least one virtual antenna port pair is obtained by combining physical antenna elements having orthogonal polarization such that the first and the second virtual antenna port have identical power radiation patterns and orthogonal polarizations,
wherein at least one antenna element per polarization has a non-zero weight,
wherein there are K antenna columns, and
wherein the non-zero weight of the antenna column comprising the at least one antenna element is determined such that $$a_k^2 + a_{K-k}^2 = C$$

where $a_k$ denotes the non-zero weight for antenna column k and where $c \neq 0$ is a constant; and
transmitting signals using said at least one virtual antenna port pair per sector in said one sector in the N sector system or in said two sectors in the 2·N sector system.

2. The method according to claim 1, wherein the non-zero weight is determined for transmission of said signals in multiple of the sectors and/or using multiple virtual antenna ports.

3. The method according to claim 1, wherein one or more of the antenna columns are turned off when transmitting said signals.

4. The method according to claim 3, wherein said one or more of the antenna columns are selectively turned on and off depending on a network traffic demand in said one sector or said two sectors.

5. The method according to claim 1, wherein all but one of the antenna columns are turned off when transmitting said signals.

6. The method according to claim 1, wherein for said one sector, two pairs of orthogonal virtual antenna ports are generated.

7. The method according to claim 1, wherein for said two sectors, one pair of orthogonal virtual antenna ports is generated.

8. The method according to claim 1, wherein for said one sector, four pairs of orthogonal virtual antenna ports are generated.

9. The method according to claim 1, wherein for said one sector, one pair of orthogonal virtual antenna ports is generated, and wherein half of all antenna columns are turned off when transmitting said signals.

10. The method according to claim 1, wherein for said one sector, two pairs of orthogonal virtual antenna ports are generated, and wherein half of all antenna columns are turned off when transmitting said signals.

11. The method according to claim 1, wherein for said one sector, one pair of orthogonal virtual antenna ports is generated, and wherein more than half of all antenna columns are turned off when transmitting said signals.

12. The method according to claim 1, wherein N=3.

13. An antenna arrangement for selectively serving either one sector in an N sector system or two sectors in a 2·N sector system, where N≥1, the antenna arrangement comprising an antenna array, the antenna array comprising at least 4 antenna columns, each antenna column comprising physical antenna elements, the antenna arrangement further comprising a processing unit, the processing unit being configured to cause the antenna arrangement to:
generate at least one virtual antenna port pair comprising a first virtual antenna port and a second virtual antenna port per sector using the physical antenna elements,
wherein each of the first and the second virtual antenna port in said at least one virtual antenna port pair is obtained by combining physical antenna elements having orthogonal polarization such that the first and the second virtual antenna port have identical power radiation patterns and orthogonal polarizations,
wherein at least one antenna element per polarization has a non-zero weight,
wherein there are K antenna columns, and
wherein the non-zero weight of the antenna column comprising the at least one antenna element is determined such that $$a_k^2 + a_{K-k}^2 = C$$

where $a_k$ denotes the non-zero weight for antenna column k and where $c \neq 0$ is a constant; and transmit signals using said at least one virtual antenna port pair per sector in said one sector in the N sector system or in said two sectors in the 2·N sector system.

14. A network node comprising an antenna arrangement according to claim 13.

15. A wireless device comprising an antenna arrangement according to claim 13.

16. An antenna arrangement for selectively serving either one sector in an N sector system or two sectors in a 2·N sector system, where N≥1, the antenna arrangement comprising an antenna array, the antenna array comprising at least 4 antenna columns, each antenna column comprising physical antenna elements, the antenna arrangement further comprising:

a processing unit; and a computer program product storing instructions that, when executed by the processing unit, causes the antenna arrangement to:

generate at least one virtual antenna port pair comprising a first virtual antenna port and a second virtual antenna port per sector using the physical antenna elements, wherein each of the first and the second virtual antenna port in said at least one virtual antenna port pair is obtained by combining physical antenna elements having orthogonal polarization such that the first and the second virtual antenna port have identical power radiation patterns and orthogonal polarizations, wherein at least one antenna element per polarization has a non-zero weight, wherein there are K antenna columns, and wherein the non-zero weight of the antenna column comprising the at least one antenna element is determined such that $$a_k^2 + a_{K-k}^2 = C$$

where $a_k$ denotes the non-zero weight for antenna column k and where $c \neq 0$ is a constant; and transmit signals using said at least one virtual antenna port pair per sector in said one sector in the N sector system or in said two sectors in the 2·N sector system.

17. An antenna arrangement for selectively serving either one sector in an N sector system or two sectors in a 2·N sector system, where N≥1, the antenna arrangement comprising an antenna array, the antenna array comprising at least 4 antenna columns, each antenna column comprising physical antenna elements, the antenna arrangement further comprising:

a transmitter;

memory;

processing circuitry coupled to the memory, the processing circuitry configured to:

generate at least one virtual antenna port pair comprising a first virtual antenna port and a second virtual antenna port per sector using the physical antenna elements, wherein each of the first and the second virtual antenna port in said at least one virtual antenna port pair is obtained by combining physical antenna elements having orthogonal polarization such that the first and the second virtual antenna port have identical power radiation patterns and orthogonal polarizations, wherein at least one antenna element per polarization has a non-zero weight, wherein there are K antenna columns, and wherein the non-zero weight of the antenna column comprising the at least one antenna element is determined such that $$a_k^2 + a_{K-k}^2 = C$$

where $a_k$ denotes the non-zero weight for antenna column k and where $c \neq 0$ is a constant; and employ the transmitter to transmit signals using said at least one virtual antenna port pair per sector in said one sector in the N sector system or in said two sectors in the 2·N sector system.

18. A computer program stored on a non-transitory computer readable medium for selectively serving either one sector in an N sector system or two sectors in a 2·N sector system, where N≥1, the computer program comprising computer code which, when run on a processing unit of an antenna arrangement comprising an antenna array, the antenna array comprising at least 4 antenna columns, each antenna column comprising physical antenna elements, causes the antenna arrangement to:

generate at least one virtual antenna port pair comprising a first virtual antenna port and a second virtual antenna port per sector using the physical antenna elements, wherein each of the first and the second virtual antenna port in said at least one virtual antenna port pair is obtained by combining physical antenna elements having orthogonal polarization such that the first and the second virtual antenna port have identical power radiation patterns and orthogonal polarizations, wherein at least one antenna element per polarization has a non-zero weight, wherein there are K antenna columns, and wherein the non-zero weight of the antenna column comprising the at least one antenna element is determined such that $$a_k^2 + a_{K-k}^2 = C$$

where $a_k$ denotes the non-zero weight for antenna column k and where $c \neq 0$ is a constant; and transmit signals using said at least one virtual antenna port pair per sector in said one sector in the N sector system or in said two sectors in the 2·N sector system.

* * * * *